July 19, 1966     D. E. ELSON ETAL     3,261,454
SAW BLADE HOLDER FOR KIT BOX
Filed Sept. 1, 1964
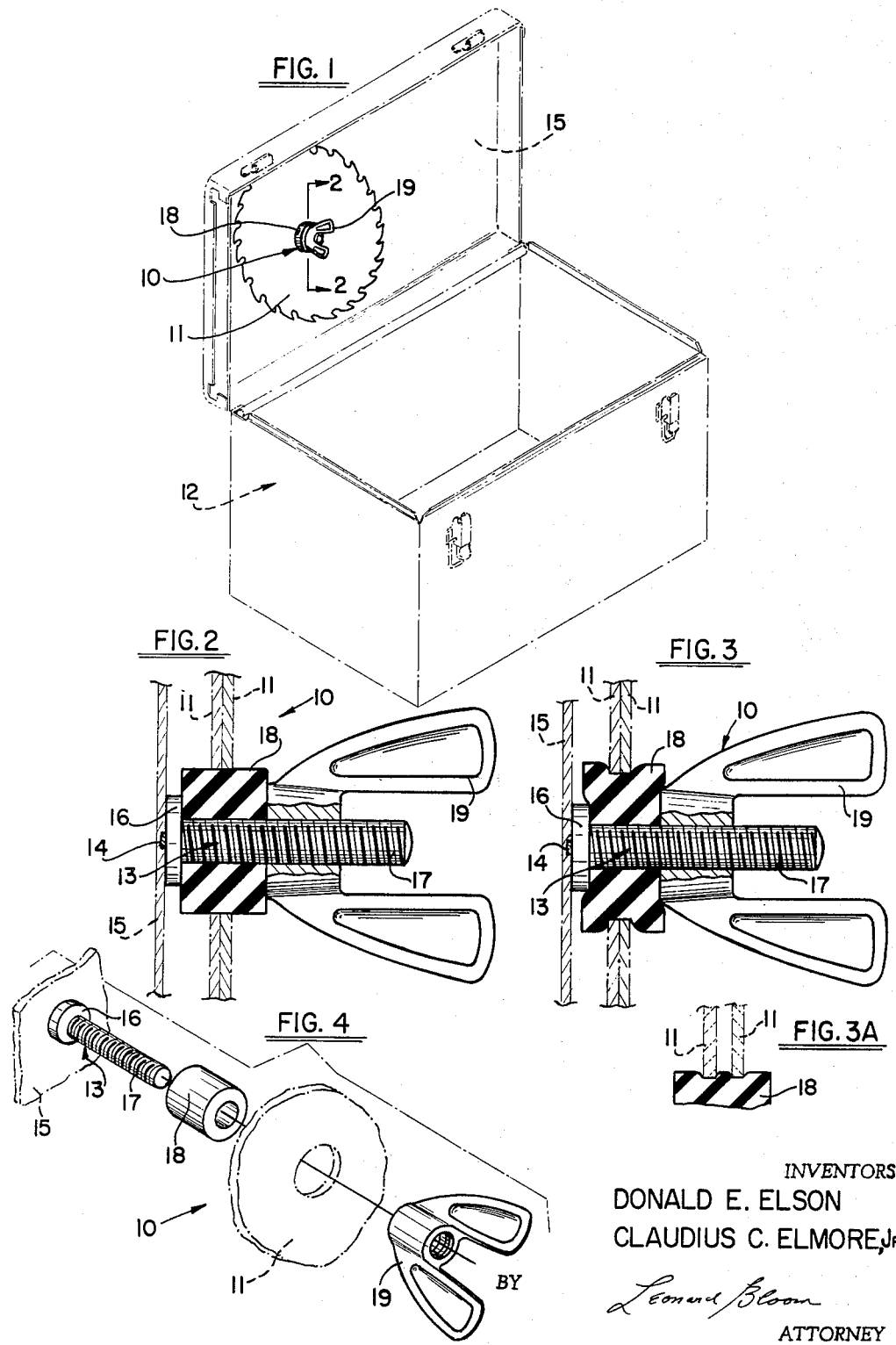
INVENTORS
DONALD E. ELSON
CLAUDIUS C. ELMORE, JR.
BY Leonard Bloom
ATTORNEY United States Patent Office 3,261,454
Patented July 19, 1966

3,261,454
SAW BLADE HOLDER FOR KIT BOX
Donald E. Elson, Baltimore, and Claudius C. Elmore, Jr., Timonium, Md., assignors to The Black and Decker Manufacturing Company, Towson, Md., a corporation of Maryland
Filed Sept. 1, 1964, Ser. No. 393,519
1 Claim. (Cl. 206—16)

The present invention relates to a saw blade holder for a kit box used to store and carry a portable electric saw and its accessories, and more particularly, to a holder which facilitates the convenient mounting of one or more saw blades within the kit box and precludes any substantial movement or chattering of the blade or blades whenever the box is carried or transported from place to place.

It is an object of the present invention to provide, in a kit box of the type described, a saw blade holder which may be manufactured easily and economically from simple readily-available components, and which will rigidly mount the blades and prevent any metal-to-metal scraping that might otherwise dull or impair the teeth of the blades.

In accordance with the broad teachings of the present invention, there is herein illustrated and described, a saw blade holder for use in conjunction with a kit box, such as may be employed for storing and carrying a portable electric saw or similar tool. The holder comprises a supporting member suitably secured within the box; a resilient member disposed on the supporting member, with one or more saw blades being disposed on the resilient member; and means to axially compress, and hence radially enlarge, the resilient member, thereby securing the saw blades against substantial movement.

Preferably, but not necessarily, the supporting member comprises a weld screw secured to the inner surface of the lid of the box, with the threaded portion of the screw extending therefrom; the resilient member comprises a resilient bushing which is fitted on the threaded portion of the screw for supporting one or more saw blades thereon; while the means to axially compress the resilient member comprises a wing nut which engages the threads on the screw and hence sandwiches the resilient bushing against the head of the screw.

These and other objects of the present invention will become apparent from a reading of the following specification, taken in conjunction with the enclosed drawings, in which:

FIGURE 1 is a perspective view of a typical kit box with which the teachings of the present invention may be employed, the view showing the saw blade holder of the present invention preferably secured within the lid of the box for retaining one or more saw blades therein;

FIGURE 2 is a longitudinal section, taken along the lines 2—2 of FIGURE 1, enlarged over the scale of FIGURE 1, and showing the manner in which one or more saw blades may be disposed on the resilient bushing of the saw blade holder;

FIGURE 3 is a longitudinal section corresponding substantially to that of FIGURE 2, but showing the manner in which the wing nut (when tightened) axially compresses the resilient bushing, thereby radially enlarging the bushing, and thereby rigidly securing the saw blades thereon;

FIGURE 3a is a view corresponding substantially to FIGURE 3, but showing how the saw blades may be spaced slightly and axially with respect to each other; and FIGURE 4 is an exploded perspective of the components of the saw blade holder.

With reference to the drawings, the saw blade holder 10 may be used for positioning and securing one or more saw blades 11 within a tool kit or box 12; the box 12 encloses a portable electric saw or other tool in the conventional manner.

The saw blade holder 10 includes a supporting member which preferably comprises a weld screw 13 secured as by a weld 14, see FIGURE 2, to a suitable inner surface of the box, such as within the hinged lid 15. Preferably, the weld screw 13 is headed as at 16 and has an integral threaded portion 17 projecting therefrom. A resilient bushing 18 (or its equivalent) is fitted, preferably by a slight sliding fit, over the threaded portion 17 of the screw 13; and one or more saw blades 11, as shown in FIGURE 2, are slidably positioned thereon. A wing nut 19 is received on the threads 17 of the screw 13; and whenever the wing nut 19 is tightened on the screw, see FIGURE 3, the resilient bushing 18 is axially compressed (preferably against the head 16 of the screw) and hence radially enlarged to frictionally secure the saw blades thereon.

In FIGURE 3a, the saw blades are shown as spaced one from another, which may be desirable in the event that the saw blades are of the "set" tooth type.

This invention provides a convenient and economical manner of securing one or more saw blades within a kit box for a saw or other tool so as to eliminate any chattering or movement of the saw blades as the box is moved about from place to place, thereby avoiding a metal-to-metal scraping which might otherwise damage the teeth of the blades or impair their sharpness.

Obviously, many modifications may be made without departing from the basic spirit of the present invention; and accordingly, within the scope of the appended claim, the invention may be practiced other than has been specifically described herein.

We claim:

In a kit box, a saw blade holder, comprising: a shouldered screw having its head portion secured to an inner surface of the box and its threaded portion extending therefrom; a resilient bushing fitted on the threaded portion of said screw; a saw blade positioned on said bushing; a wing nut engaging the threads of said screw axially compressing said bushing against said shoulder and radially enlarging said bushing thereby frictionally securing the saw blade in place on said bushing and preventing any substantial rubbing or scraping of the blade against the inner surface of the box.

References Cited by the Examiner

UNITED STATES PATENTS

| 2,605,588 | 8/1952 | Lindstaedt | 85—70 X |
| 2,828,095 | 3/1958 | Beck et al. | 85—70 X |

FOREIGN PATENTS

| 245,283 | 6/1963 | Australia. |
| 849,069 | 9/1962 | Germany. |

LOUIS G. MANCENE, *Primary Examiner.*